Figure 1:
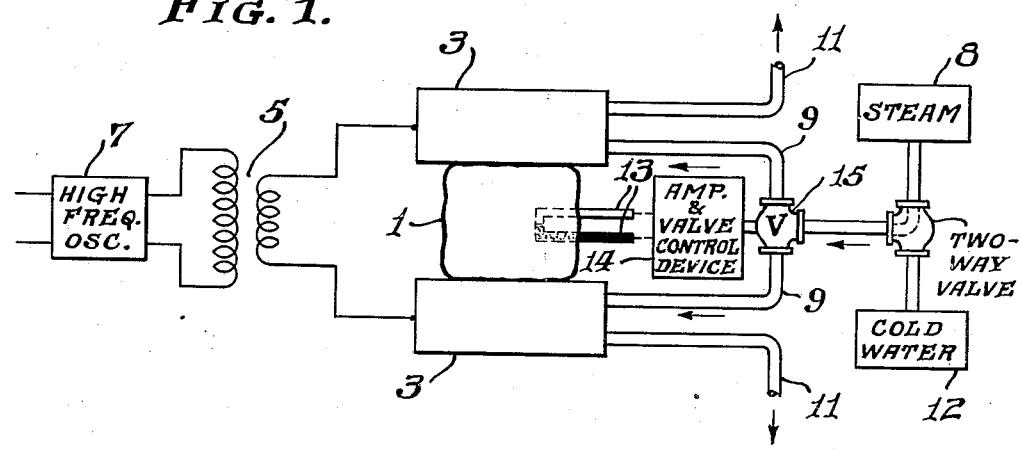

Nov. 13, 1945.  G. H. BROWN  2,388,824

METHOD OF AND APPARATUS FOR HEAT TREATING DIELECTRIC MATERIALS

Filed March 9, 1943

Inventor
George H. Brown

By C D Tuska

Attorney

Patented Nov. 13, 1945

2,388,824

UNITED STATES PATENT OFFICE 2,388,824

METHOD OF AND APPARATUS FOR HEAT-TREATING DIELECTRIC MATERIALS

George H. Brown, Princeton, N. J., assignor to Radio Corporation of America, a corporation of Delaware Application March 9, 1943, Serial No. 478,521

6 Claims. (Cl. 18—1)

This invention relates to the heat treatment of materials, and more particularly to the heat treatment, with the aid of electrical energy, of materials which undergo a prescribed change when subjected to a predetermined temperature, such as the curing of thermosetting resins.

The use of a high frequency electric field for heating dielectric materials, including thermosetting plastics or resins, is fairly well known. In connection with thermosetting resins, this method has been employed for the purpose of curing the material. In general, high frequency energy as a heating source is desirable because it produces uniform dielectric losses, and therefore uniform heating, throughout the material. In most cases, however, the material is also subjected to a molding operation under heat and pressure, and it has been customary to apply the heat and pressure simultaneously in a suitable press, without the use of radio frequency energy. The disadvantage of using a heated press alone is that the outer portions of the material become heated to a greater extent than the inner portions thereof, and therefore the outer regions of the material reach the curing temperature before the inner regions thereof do. Thus, if the outer regions of the material are properly cured, the inner region thereof is under cured, whereas if sufficient heat reaches the center of the material to properly cure the inner region thereof, then the outer regions are over cured. In either case, the result is that there are strains set up in the material, and this is particularly true of many materials which are such poor heat conductors that it takes a long time to bring all portions thereof to a uniform temperature when heated by conventional methods.

It has also been proposed, heretofore, to preheat the work rapidly by means of a high frequency electric field and then place the heated work in a heated press where pressure is applied. Unless, however, the press plates are maintained at the temperature of the work, there is an exchange of heat either from the work to the plates, in which case the temperature of the work falls below the curing temperature, or from the plates to the work, in which case the temperature of the latter is raised above that required for curing and the parts of the work immediately adjacent the press plates become cured before the other parts thereof are cured. Where, as in some cases, the press plates have been utilized as the electrodes by means of which the electric field is applied to the work and dielectric heat insulating members have been interposed between the electrode press plates and the work, a considerable amount of electrical power is necessarily wasted by the insulating members, thereby reducing the efficiency.

The primary object of my present invention is to provide an improved method of heat treating materials of the type set forth above, which method will be free from the disadvantages of corresponding prior art methods.

More particularly, it is an object of my present invention to provide an improved method of curing thermosetting, dielectric materials which will provide a uniformly cured product.

It is also an object of my present invention to provide an improved method as above set forth which is economical and highly efficient in use.

In accordance with my present invention, I preheat the thermosetting, dielectric material uniformly throughout to the curing temperature by subjecting the material to a high frequency electric field which produces uniform dielectric losses therein. When the material is either approaching or has already been brought to the curing temperature, as may be found most desirable, pressure may be applied thereto in a press the plates of which are heated by a different form of heating energy, such as steam, which supplies energy to the plates at a rate sufficient to maintain the plates at substantially the same temperature as the work. Thus, the heated plates themselves act as heat insulating members which prevent the heat in the work from flowing out, thereby confining to the work the heat developed therein by the electric field. In this way, uniform heating and resultant uniform curing are assured.

The novel features that I consider characteristic of my invention are set forth with particularity in the appended claims. The invention itself, however, both as to its organization and method of operation, as well as additional objects and advantages thereof, will best be understood from the following description, when read in connection with the accompanying drawing, in which Figure 1 is a diagrammatic view illustrating the manner of heat treating the work in a press according to one form of my present invention, and Figure 2 is a similar view illustrating the manner of applying heat to the work by means of an electric field separately from the press.

Figure 2:
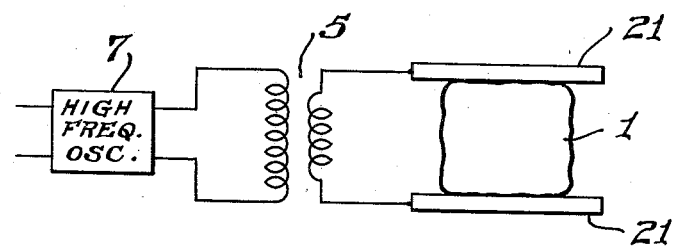

Referring more particularly to the drawing, wherein similar reference characters designate corresponding parts throughout, there is shown, in Figure 1, a material 1 which may be a thermosetting, dielectric plastic material, such as any of the well known thermosetting resins. The material 1 is disposed between a pair of relatively movable press plates 3 which are connected through a suitable coupling transformer 5 to a source of high frequency energy, such as a vacuum tube oscillation generator 7. The press plates 3 may themselves constitute molding dies, or they may have suitable molding matrices secured to them. Either one or both of the press plates 3 may be insulated electrically from the frame of the press, depending upon the electrical coupling to the transformer 5. The uniform electric field set up between the electrode press plates 3 will produce uniform dielectric losses in the material 1 and thereby heat the material uniformly throughout. The electric field should be of a frequency and intensity which are, respectively, determined by the nature and bulk of the material 1. The field should also be determined with due regard for the length of the operating cycle and should be applied to the work for a period of time sufficient to raise the temperature of the material 1 to its curing point.

The material 1 may be subjected to a requisite molding pressure between the plates 3 either while it is being brought up to the curing temperature, or when the curing temperature has been reached, as may be found most suitable. To prevent the heat developed in the material 1 by the aforementioned electric field from flowing out of it, the press plates 3 may be heated preferably by some other form of relatively less expensive heating energy than the electric field, such as steam supplied to the plates 3 from a suitable source 8 through inlets 9 and withdrawn through outlets 11, or by means of electrical resistance elements buried in the plates 3, or in any other suitable manner. By means of this second form of heating energy, the press plates 3 are maintained at substantially the same temperature as the curing temperature of the material 1 whereby the heated plates 3 themselves act as insulating members which confine within the material 1 the heat originally developed therein. The plates 3 are maintained at the requisite temperature for a period of time sufficient to effect curing of the resin or the like 1, after which cold water may be passed through the plates 3 from a source 12 in well known manner to lower the temperature of the work to a point where it can be handled comfortably for removal from the press.

Where it is desired to raise the temperature of the plates 3 in correspondence with the increase in temperature of the work 1, and for the purpose of thereafter maintaining the plates 3 and the work 1 constantly at the same temperature, a thermocouple 13 may be applied to the material 1 and its output connected through a suitable amplifier and valve control device 14, the latter of which may be constituted by a reversible motor and a reduction gear box, for example, to a valve 15 which connects the inlets 9 to the source of steam 8. The amplified voltages developed by the thermocouple 13 as a result of temperature variations in the work 1 will cause the motor to rotate in one direction or the other and, through the reduction gear system, will cause the valve 15 to open or close more or less, as the case may be, to thereby control the flow of steam to the press plates 3. In this way, the temperature of the plates 3 may be held to within fairly close limits of the temperature of the work 1.

Instead of utilizing the press plates 3 as the heating electrodes between which the electrostatic field is set up, the material 1 may be placed between a pair of electrodes 21, as shown in Figure 2, which are not a part of the press, as in the case of the first described modification. The electrodes 21 are connected through the transformer 5 to the oscillation generator 7, and the field set up between them serves to heat the material 1 uniformly and rapidly to the curing temperature. The material 1 may then be quickly transferred to a suitable press and placed between the press plates 3 thereof, but in this case, the plates 3 are connected only to the steam source 8 but not to the oscillation generator 7. The material 1 may then be subjected to the requisite molding pressure between the plates 3, and the temperature of the plates 3 maintained at the desired point in the manner above described.

From the foregoing description, it will be apparent to those skilled in the art that I have provided a simple and efficient method of heat treating materials for the purposes above set forth, the heated press plates acting as heat insulating members to confine within the work the heat developed uniformly in all parts thereof by the electric field. Although I have shown and described two specific ways of carrying out the invention and one particular application thereof, it will, no doubt, be apparent to those skilled in the art that many other forms thereof and applications therefor are possible. Thus, the present invention is applicable to materials in which a prescribed change takes place upon application of heat thereto other than thermosetting materials. For example, where it is desired to sterilize liquids by subjecting them to certain temperatures for given periods of time, the liquids may first be heated rapidly to the required temperature by subjecting them, in suitable containers, to the influence of a high frequency electric field, and the containers thereafter disposed in steam filled or otherwise suitably heated cabinets which will act as insulators against the loss of heat from the liquids for the required time interval. Many other applications of the present invention, as well as changes in the manner of carrying it into effect and the forms of apparatus by which it may be practiced will, no doubt, readily suggest themselves to those skilled in the art. I therefore desire that my invention shall not be limited except insofar as is made necessary by the prior art and by the spirit of the appended claims.

I claim as my invention:

1. The method of heat treating a dielectric material of the type adapted to undergo a prescribed change when subjected to a predetermined temperature which comprises subjecting said material to an alternating electric field of sufficient intensity and for a period of time sufficient to raise all parts thereof uniformly to said temperature by reason of the dielectric losses therein resulting from said electric field, simultaneously maintaining said heated material between and in contact with at least a pair of heat conductive members and heating said members to substantially said temperature whereby to substantially prevent the flow of heat out of said material to said members, and maintaining said members at substantially said temperature for a period of time sufficient to effect said change.

2. The invention set forth in claim 1 characterized in that said members are maintained at substantially said temperature by the application thereto of a different form of heating energy than an alternating electric field.

3. The invention set forth in claim 1 characterized in that said members are heated by the application of steam thereto.

4. The invention set forth in claim 1 characterized in that said members are heated by a heating medium, and characterized further in that the flow of said medium to said members is controlled by the temperature of said material.

5. In apparatus for heat treating material, the combination of a pair of spaced heating members adapted to receive said material therebetween, a first source of heating energy coupled to said members for heating said material, a second source of heating energy coupled to said members for simultaneously heating said members, a thermoelectric device adapted to be placed in engagement with said material and responsive to the thermal condition of said material for generating voltages corresponding to changes in thermal condition of said material, and means responsive to the voltage output of said thermoelectric device connected to said second source for controlling the supply of heating energy to said members from said second source.

6. In apparatus for heat treating a thermosetting, dielectric material, the combination of a pair of spaced, conductive members adapted to receive said material therebetween, a source of high frequency electrical energy coupled to said members for setting up between said members a high frequency electric field whereby to produce dielectric losses in said material to thereby heat said material, a second source of heating energy coupled to said members for simultaneously heating said members, a thermoelectric device adapted to be placed in engagement with said material and responsive to the thermal condition of said material for generating voltages corresponding to changes in thermal condition of said material, and means responsive to the voltage output of said thermoelectric device connected to said second source for controlling the supply of heating energy to said members from said second source.

GEORGE H. BROWN.